United States Patent Office 3,387,053
Patented June 4, 1968

3,387,053
DEHYDROGENATION CATALYST AND PROCESS
Emerson H. Lee, Creve Coeur, Mo., assignor to Monsanto Company, St. Louis, Mo., a corporation of Delaware
No Drawing. Filed Nov. 12, 1965, Ser. No. 507,514
15 Claims. (Cl. 260—669)

ABSTRACT OF THE DISCLOSURE

More saturated hydrocarbons are dehydrogenated to less saturated hydrocarbons in the presence of steam and a catalyst containing iron oxide as the major active catalytic agent together with from about 1% to about 8% by weight of either zinc oxide or copper oxide intimately dispersed in the matrix of the iron oxide to a degree such as to characterize the catalyst prior to use by a magnetic susceptibility of from about $30 \times 10^{-6}$ to about $300 \times 10^{-6}$ c.g.s.u., and an alkali promoter, said catalyst having a surface area of from about 1 to about 5 square meters per gram.

---

The present invention relates to the dehydrogenation of hydrocarbons. More particularly, it relates to an improved process for the dehydrogenation of low molecular weight hydrocarbons having 2 to 6 carbon atoms and to the dehydrogenation of alkyl aromatic hydrocarbons such as ethylbenzene to produce vinyl aromatic hydrocarbons such as styrene and to an improved modified iron oxide catalyst therefor.

Many valuable chemical compounds of commerce are produced by selective catalytic dehydrogenation of hydrocarbons. Butene, for example, is produced by hydrogenation of butanes. Butene itself can be converted to butadiene by catalytic dehydrogenation and alkyl aromatic compounds such as ethylbenzene yield vinyl aromatic compounds such as styrene when subjected to catalytic dehydrogenation. Butene is an essential raw material for the production of iso-octane or other high-octane-number hydrocarbons suitable for use as motor fuels. Butadiene is an essential raw material in the production of synthetic rubbers. In addition to its ability to copolymerize with butadiene to form synthetic rubbers, styrene can be polymerized with various other comonomers to produce a variety of plastic materials and resins which are suitable for manufacturing numerous articles of commerce by casting, compressing, molding and the like. Styrene can also be homopolymerized to produce polystyrene, one of the most familiar and widely used synthetic resins.

The catalytic dehydrogenation process for making the products referred to above is usually carried out by passing the hydrocarbon together with a relatively large proportion of steam, for example, 2 to 30 moles of steam per mole of hydrocarbon, over a bed of suitable catalyst at elevated temperatures. The catalysts used in the process usually contain as a primary active constituent certain metals of Groups IV and VIII of the periodic table either in their free form or, preferably, in the form of various of their compounds such as the oxides, sulfides, phosphates, etc. Generally, mixtures of two, three, or more of such compounds are employed. Some of these catalysts, however, are characterized by certain disadvantages such as low conversion and/or selectivity of reaction, poor physical strength, short catalyst life, and necessity for frequent regeneration. Typical catalyts which have been found to have a minimum of these disadvantages are alkalized iron oxide catalysts wherein an alkali metal or alkaline earth metal compound is employed as a promoter, said promoter being usually a compound of potassium. These catalysts are autoregenerative under conditions at which the dehydrogenation reaction is effected, that is, they are capable of being continually regenerated under the conditions of the reaction. This obviates the necessity for interrupting the process and regenerating the catalyst, a procedure which includes burning the carbon deposits off the surface of the catalyst particles, as is required with other dehydrogenation catalysts. While these catalysts are generally suitable and widely used because of the above-mentioned advantages as they are currently employed in the art, they do not provide maximum selectivity of reaction, that is, with their use too much of the hydrocarbon is converted to undesirable low-grade products. For example, in the dehydrogenation of ethylbenzene to styrene over these catalysts, side reactions result in the conversion of ethylbenzene to benzene and to toluene as well as to styrene.

It has now been discovered that in the dehydrogenation of more saturated hydrocarbons to less saturated hydrocarbons using alkalized iron oxide catalysts having a specified surface area, the catalytic behavior of iron oxide is related to the free electron density of the catalyst which in turn depends upon whether the iron oxide present in the catalyst is a p-type semi-conductor or an n-type semi-conductor. Metals and n-type semiconductors have a higher density of free electrons than do p-type semiconductors. Experiments have shown that if the iron oxide in such deyhdrogenation catalysts is made a p-type semi-conductor by intimately dispersing to the extent of chemical interaction a minor amount of another metal oxide, specifically an oxide of a metal selected from the group consisting of zinc and copper, in the matrix thereof, the selectivity of the resulting catalyst is significantly improved. In view of their function, these oxides added to iron oxide are conveniently referred to hereinafter as "matrix promoters" to distinguish them from the promoters already known in the art. Frequently, an increase in selectivity of a catalyst for styrene production is accompanied by a consequent loss in activity. However, with the newly discovered iron oxide catalysts of this invention, i.e., those containing a matrix promoter, the high selectivity for styrene production is obtained without any sacrifice in activity. It is to be understood that wherever in this specification the term "iron oxide" is employed, it means iron oxide in which the valence of iron is $+3$, i.e., ferric oxide, $Fe_2O_3$. It should be noted, however, that in the use of the catalyst in this invention, the iron will be reduced to a lower valence, that is, to $Fe_3O_4$ or $FeO \cdot Fe_2O_3$.

It is an object of the present invention, therefore, to provide an improved process for the dehydrogenation of more saturated hydrocarbons to less saturated hydrocarbons in the presence of steam. More particularly, it is another object of the invention to provide an improved process for the dehydrogenation of low molecular weight hydrocarbons having 2 to 6 carbon atoms and alkyl aromatic hydrocarbons having at least two carbon atoms in the alkyl group such as ethylbenzene to the corresponding vinyl aromatic hydrocarbons such as styrene. Even more specifically, it is an object of the present invention to provide a novel catalyst for use in the process of dehydrogenating ethylbenzene to styrene which has a maximum selectivity for the production of styrene.

These and other objects of the invention which will become apparent from the following description are accomplished by the use of a dehydrogenation catalyst comprising iron oxide as the active catalytic agent, from about 1% to about 8% by weight of an oxide of a metal selected from the group consisting of zinc and copper intimately dispersed in the matrix of said iron oxide, the degree of said dispersion being such as to characterize the catalyst prior to use by a magnetic susceptibility in the range from about $30 \times 10^{-6}$ to about $300 \times 10^{-6}$ centimeter-gram-second unit (c.g.s.u.), and an alkali promoter, said catalyst composition having a surface area in the range from about 1 to about 5 square meters per gram (m.$^2$/g.). In the preferred embodiment of the invention, the metal oxide intimately dispersed in the matrix of the iron oxide is zinc oxide and the alkali promoter is a compound of an alkali metal. Other compounds may be present in addition to the three essential ingredients such as stabilizers, diluents, binders, and the like.

The oxides disclosed above as matrix promoters have been proposed heretofore as suitable ingredients in iron oxide dehydrogenation catalysts. For example, in U. S. Reissue Patent 22,800 to Kearby, zinc oxide is proposed as a catalyst ingredient in conjunction with iron oxide, a promoter and a stabilizer, the zinc oxide being present in 50 to 97 parts by weight of the catalyst mass and serving as a base or carrier for the other ingredients. In later patents to Kearby, namely 2,395,875 and 2,395,876, zinc oxide together with copper oxide have been suggested as catalyst ingredients of a promoted iron oxide-magnesium oxide catalyst. In these disclosures, the matrix promoters of the present invention are suggested as stabilizers to prevent the alkali promoter from volatilizing and the catalyst from becoming inactive. In the Kearby catalyst, the preferred promoter is potassium oxide and the stabilizer oxide is incorporated in the catalyst composition subsequent to the precipitation of the iron hydroxide on the magnesium oxide support. Thus, the stabilizer oxide is not coprecipitated with the principal catalytic ingredient but is added later with the promoter.

In the present invention, the matrix promoter is believed to function as a modifier or conditioner of the iron oxide component of the catalyst rather than to serve as a stabilizer to prevent the promoter from volatilizing or the catalyst from becoming inactive as is taught in the art. Accordingly, in the highly selective catalyst compositions of the present invention, a critical concentration of the second metal oxide, i.e., the matrix promoter, is intimately incorporated into the iron oxide matrix making the resulting composition distinguishable on the basis of its magnetic susceptibility. This magnetic susceptibility reflects the existence of the ferrites of zinc and/or copper, which are magnetic, in the catalyst composition. Alternatively, the existence of these compounds can be determined by X-ray diffraction patterns but magnetic susceptibility measurements are more sensitive.

The catalyst of this invention contains iron oxide as the predominating active dehydrogenating constituent. A convenient and economical source of iron oxide is in the form of commercial pigments which are of uniform purity and particle size. However, iron oxides may also be prepared by the thermal decomposition of iron compounds such as ferric nitrate, ferric oxalate and the like or by precipitation from solutions of iron salts such as ferric nitrate, ferrous sulfate, etc., followed by thermal decomposition. Generally, however, the latter procedures do not produce an oxide of uniform characteristics and high purity at a cost competitive with that of commercial pigments. The concentration of the iron oxide in the finished catalyst may vary over a wide range. The catalyst should contain on a finished basis at least about 35% by weight of iron oxide. Preferably, the concentration of iron oxide is maintained in the range from about 45% to about 95% by weight.

The concentration of the metal oxide employed as a matrix promoter added to the iron oxide to make it a p-type semi-conductor is critical. Amounts employed are those in the range from about 1% to about 8% by weight of the total catalyst composition. Preferably, the matrix promoter should be present in the amounts from about 2% to about 5% by weight of the total catalyst composition.

The matrix promoter must be added to the iron oxide in such a manner as to result in such intimate dispersion that chemical interaction is effected in the matrix of the iron oxide. This can be accomplished in several ways but is not effected by mere dry or wet mixing of the oxide constituents. One method for preparing the catalyst of the invention involves the coprecipitation of the iron and matrix promoter oxides. In this method, suitable soluble salts of iron such as ferrous sulfate or ferrous nitrate and of the matrix promoter such as, for example, in the case of the preferred matrix promoter, zinc sulfate or zinc nitrate, are dissolved in water and coprecipitated by adding a sufficient amount of a dilute solution of an alkali metal hydroxide to obtain a pH of about 7. When a ferrous salt is utilized, the slurry is preferably air-blown with heating (120–180° F.) for one or two hours to oxidize the iron to a +3 state with the pH being maintained between 6.8 and 7.2 by the addition of an acid such as sulfuric if necessary. Excess alkali metal sulfate is washed out and the slurry is filtered. The filter cake is washed with water, calcined at a temperature from about 250 to about 1500° F. and then pulverized as in a hammer mill, for example. The coprecipitated oxides of iron and the metal oxide used as the matrix promoter, zinc oxide, for example, are mix-mulled with the promoter, stabilizer, binder, or any other desired catalyst constituents until a uniform mixture is obtained. Water is added during mixing to develop the consistency of the mass to a paste suitable for extrusion. Small amounts of extrusion aids may also be incorporated into the paste. For example, 0.1% to 0.2% of such materials as stearic acid, hydrogenated cottonseed oil, tannic acids or tannins may be added to modify the rheological properties of the mixture to aid in extrusion into pellets. The paste is extruded to the desired size and the extrusion are air-cured prior to calcination at temperatures from 600 to 1500° F. The calcination is carrier out at such temperatures and for such times as to reduce the surface area to within the range from 1 to 5 m.$^2$/g.

An alkali promoter is also an essential constituent of the catalyst. Compounds of the alkali metals such as the oxides or compounds convertible at least in part under dehydrogenation conditions to the oxides such as the hydroxides, the carbonates, the bicarbonates, the phosphates, the borates, the acetates, and the like are useful as promoters. Of the alkali metal compounds, potassium compounds are preferred. Cesium and rubidium compounds are suitable but are generally not used because of their high cost. While the sodium compounds are less expensive than those of potassium, the latter are considered to be superior as promoters. A particularly preferred promoter is potassium carbonate. The amount of promoter in the catalyst may vary from about 0.5% by weight of the catalyst up to about 50% by weight or more. Preferably, the alkali metal promoter is incorporated in the catalyst in amounts from about 5% to about 35% by weight. If it is desired to control the dehydrogenation process so that the least possible amount of toluene will be produced while the maximum yield of styrene is being attained, a composite promoter can be used. Such a promoter is one containing a potassium compound and a compound of a metal chosen from the group consisting of sodium, lithium, barium, magnesium, and calcium wherein the potassium compound constitutes at least 1% by weight of the total catalyst composition and the weight ratio of the second metal compound to the potassium compound is maintained within the range from about 1:1 to about 5:1 and preferably from about 1:1 to about 2:1 as described in U.S. Patent 3,100,234.

As indicated above, other ingredients may be present or not, as desired, in the catalyst composition. Heavy metal oxides more difficultly reducible than iron oxide which function as stabilizers can be included, for example. These metal compounds may be incorporated per se in the catalyst or they may be formed therein during the catalyst preparation from primary compounds such as the hydroxides, carbonates, nitrates, and the like. The concentration of such stabilizers is not critical. Only small amounts are required. Chromium oxide is the preferred stabilizer and this compound is generally employed in amounts from about 1% to about 5% by weight. Diluent materials such as alumina, zirconia, beryllia, and asbestos can also be incorporated in the catalyst as can binding agents, for example, silicates, hydraulic cements such as Portland cement, calcium aluminate cement, etc., kaolin, ball clay and the like, if desired, which impart structural stability to the catalyst composition.

The shape and size of the catalyst particles are not critical. For example, the catalyst may be in the form of pellets, powders, pills, tablets, spheres, saddles, etc. Symmetrical pills of $\frac{1}{50}$ inch to $\frac{3}{4}$ inch in diameter and $\frac{1}{16}$ inch to 1 inch in length are considered to be satisfactory. The preferred size of the catalyst particles for most commercial operations is usually from $\frac{1}{16}$ to $\frac{3}{16}$ inch in diameter.

Surface area of the catalyst, however, is a critical factor. Even if the matrix promoter is present as determined by magnetic susceptibility measurements in the concentration range specified, the desired selectivity of reaction is not obtained if the surface area or available surface of the catalyst is too large. Thus, the improved catalysts of the invention are those with a surface area or available surface from about 1 to about 5 square meters per gram. It is preferred to adjust the surface area during the manufacture of the catalyst; however, with some formulations, catalysts can be prepared with higher surface areas allowing for subsequent surface area reduction to the preferred range during use of the catalyst.

The dehydrogenation of ethylbenzene is carried out in the vapor phase at temperatures above about 580° C. and preferably between 600° and 700° C. Somewhat higher temperatures up to about 800° C. can be used but are generally less suitable. The dehydrogenation may be effected at any desired pressure. However, the partial pressure of the hydrocarbon reactant in the reaction zone is preferably not more than about one atmosphere. The low pressure of the reactant may be obtained by operating under subatmospheric pressure or at a low partial pressure by use of a diluent while operating at normal total pressure or at superatmospheric pressure. Steam is a particularly good diluent in most cases and is preferably employed in large amounts, for example, between 2 and 30 moles of steam per mole of hydrocarbon feed. Contact time is adjusted by the rate of flow to afford the desired degree of conversion. In general, flow rates of reactant corresponding to gaseous hourly space velocities (measured at standard conditions) between about 300 and 3000 may be employed.

The superiority of the catalyst of the invention is readily apparent from a consideration of the following examples which are not to be construed, however, as limiting the invention except as it is limited in the appended claims.

Example 1

A series of catalysts were prepared containing varying amounts of iron oxide as the active catalytic ingredient and zinc oxide. In addition, these catalysts contained about 26.0% potassium carbonate ($K_2CO_3$) as a promoter, about 2.5% chromic oxide ($Cr_2O_3$) as a stabilizer, and about 20% Portland cement as a binder. Catalysts 1 and 3 of the series were prepared as follows: Ferrous sulfate and zinc sulfate monohydrate were dissolved in water at 120° F. Coprecipitation of the iron-zinc was effected by adding over a period of 1½ hours a 10% solution of sodium hydroxide (NaOH) to a pH of 7.0±0.2. The resulting slurry was air-blown for about one hour at 120° F. During this procedure, the pH of the slurry was maintained between 6.8 and 7.2 by the addition of the necessary amounts of sulfuric acid. Excess sodium sulfate was washed out by means of a Sperry thickener, the slurry being washed until the concentration as measured with a conductivity measuring device calibrated for NaOH was about 0.05%. The slurry was then filtered, and the filter cake was washed thoroughly with water, dried, calcined at 1300° F., and then pulverized in a hammer mill.

A quantity of the pulverized, coprecipitated iron-zinc oxides in the desired relative proportions of these materials was weighed and transferred to a muller together with the required amounts of anhydrous potassium carbonate, chromic oxide, and Portland cement to provide the concentrations given above. The mixture was mixmulled until uniform. Demineralized water was added while mulling to convert the mixture into an extrudable plastic mass. This mass was then extruded into ⅛ inch diameter extrusions which were air-cured for about five days. The extrusions were broken into short lengths and calcined at 1300° F. for about six hours.

Catalyst 4 with a composition essentially the same as that of Catalyst 1 was made by mixing iron oxide, zinc oxide, potassium carbonate, chromic oxide, and Portland cement into a paste with sufficient water to produce an extrudable plastic mass which was then extruded into ⅛-inch diameter extrusions, dried, broken into short lengths, and calcined in air at 1300° F. in the same manner as the foregoing catalyst compositions. Measurement of the magnetic susceptibility of Catalysts 1 and 4 was made in air at 17° C. by the well known Gouy method, a description of which can be found in "Physical Methods of Organic Chemistry," Arnold Weissberger, Editor, Interscience Publishers, New York, 1946, vol. II, pp. 1221–9. The data obtained are presented in Table I.

A series of tests were then conducted utilizing the prepared catalysts. The selectivities of all of the catalysts were determined in a differential reactor consisting of a 20-mm. O.D. quartz tube shielded by a stainless steel jacket and heated by means of a tube furnace. The catalyst pellets of known weight (1–10 g.) were placed in a quartz boat about 100 mm. x 15 mm. disposed within the reactor, a 60-mesh stainless steel screen being used to support the samples. Catalyst beds were only one or two pellets in depth in order to eliminate apparent differences in catalyst activity in depth in order to eliminate apparent differences in catalyst activity caused by the limited rate of diffusion of gases through the bed.

The reactor was heated and steam was passed through it overnight to remove air from the system. Ethylbenzene (99.5 to 99.7% purity) with steam in a weight ratio of steam to ethylbenzene of 2.2 to 1 was passed through the reactor at a rate of 30 g. per hour, a pressure of one atmosphere and at a temperature of about 600° C. over a reaction period of 8 hours. Temperatures were recorded by means of thermocouples located within the reactor.

The effluent gas passed from the reactor into a water-cooled condenser and the condensate was collected in a receiving flask. Noncondensible gas was passed through a wet-test meter and vented after measurement. Samples of the organic condensate were analyzed by vapor phase chromatography for styrene, benzene and toluene with precautions being taken to prevent any loss of benzene and toluene from the sample. Low levels of conversion to styrene (1–8%) were maintained throughout the experiment in order to remain in the differential range and to assure that any effects would be only those attributable to the catalyst. Selectivity of each catalyst tested for styrene is recorded in Table I. Selectivity is defined as follows:

$$\text{Selectivity} = \frac{\text{Moles Styrene}}{\text{Moles (Styrene} + \text{Benzene} + \text{Toluene)}} \times 100$$

All selectivity data given are for the catalytic reaction only, corrections based on experimental determination having been made for any thermal reaction occurring.

TABLE I

| Catalyst No. | Composition, Wt. Percent | | Selectivity to Styrene (Mole Percent) | Magnetic Susceptibility (c.g.s.u.×10⁻⁶) |
|---|---|---|---|---|
| | $Fe_2O_3$ | ZnO | | |
| 1 | 46.5 | 5 | 95.4 | 60.3 |
| 2 | 49.5 | 2 | 94.3 | |
| 3 | 41.5 | 10 | 92.2 | |
| 4 | 46.5 | 5 | 91.9 | 17.5 |

The foregoing data show that a sizeable increase in selectivity to styrene is obtained using Catalysts 1 and 2 as compared to Catalysts 3 and 4. Catalyst 4 had the same percentage composition as Catalyst 1 but a significantly lower magnetic susceptibility which indicates that the zinc oxide was dispersed in the matrix of the iron oxide only to a minor extent, if at all, in this catalyst as compared to Catalyst 1. Further, it is apparent from the data, that although the zinc oxide is dispersed in the matrix of the iron oxide, the amount of zinc oxide present as a matrix promoter is critical in that the characteristic high selectivity is obtained with amounts of the zinc oxide which are less than 10% by weight of the catalyst composition.

Example 2

Catalysts 5 and 6 analogous to Catalyst 1 in Example 1 were prepared containing about 46.2% iron oxide as the active catalytic agent, about 5% of either zinc oxide or copper oxide as a matrix promoter, about 26% potassium carbonate ($K_2CO_3$) as a promoter, 2.5% chromic oxide ($CR_2O_3$) as a stabilizer, and about 20% Portland cement as a binder. A modified procedure from that of Example 1 involving the use of a wet mulling technique was employed to prepare these catalysts as follows: The desired weighed quantities of 2772 parts by weight pigment-grade iron oxide and 350 parts by weight of the second metal oxide mentioned above were placed in a Simpson Mix Muller. The two were mixed dry for five minutes. Next, there was added 1500 parts by weight of a 28% $NH_4OH$ solution as the mulling was continued for five minutes while the solution was added. The thus wetted mix was then mulled for about 15 minutes and at the end of this time 1578 parts by weight of potassium carbonate was added followed by 150 parts by weight of chromium oxide. After the promoter and stabilizer had been added, the Portland cement (1200 parts by weight) and enough water (100 parts by weight) to convert the mixture to an extrudable plastic mass were mixed in. After ten minutes of additional mixing, the mass was extruded as ⅛ inch diameter extrusions. The extrusions were cured in air for six days and then calcined for two hours at 250° F., two hours at 400° F. and six hours at 1300° F.

The specific surface area or available surface of each of these catalysts was determined and the magnetic susceptibility of each of them was measured.

Experiments were conducted to determine the effectiveness of these catalysts for the production of styrene. Simultaneously, a commercially available alkali-promoted iron oxide catalyst was tested. All catalysts were employed in the form of ⅛ inch extrusions. The dehydrogenation of ethylbenzene using these catalysts was effected in an isothermally operated integral reactor consisting of a 5-ft. stainless steel tube 1¼ in. inside diameter heated by electrical means and encased in an insulated jacket. The reactor was packed with catalyst by pouring the material into the tube through a funnel to obtain a loosely packed bed about 43 in. deep supported on a stainless steel screen. Sample taps and thermocouples reaching into the catalyst bed were provided at 6-in. intervals along the length of the bed. The temperature of the catalyst bed was brought up to about 300° C. with nitrogen flowing through the reactor. Steam was then introduced and the temperature was raised to 600° C. and allowed to remain at this level overnight for preconditioning of the catalyst. Steam and ethylbenzene (99.7%) in a weight ratio of about 2.2:1 was then fed to the reactor at a gas hourly space velocity of 595 (volume of feed gases at standard temperature and pressure per volume of catalyst per hour) while it was maintained at a temperature of about 600° C. Conversions over a wide range were measured by means of samples drawn from the taps in the reactor, flows from the sample taps never exceeded about 10% of the total flow to avoid changing the flow pattern in the reactor. The effluent gas streams passed from the reactor into a water-cooled condenser and the condensates were collected in receiving flasks. Non-condensible gas was passed through a wet test meter and vented after measuring. Samples of the organic condensates were analyzed for styrene, benzene, and toluene with precautions being taken to prevent any loss of benzene and toluene from the sample. Selectivity (as defined in Example 1) of each catalyst tested for styrene is recorded in Table II below together with the specific surface area, and the magnetic susceptibility of the catalysts.

TABLE II

| Catalyst No. | Matrix Promoter | Surface Area (m.²/g.) | Magnetic Susceptibility (Vol.) (c.g.s.u.×10⁻⁶) | Net Conv. Across Catalyst Bed, percent [1] | Selectivity to Styrene (Mole percent) | Hr. |
|---|---|---|---|---|---|---|
| 5 | ZnO | 2.3 | 195.3 | 45.9 / 54.7 / 60.5 | 94.6 / 93.6 / 91.8 | 1,097 |
| 6 | CuO | 3.2 | 202.5 | 45.7 / 53.6 / 61.1 | 94.6 / 93.6 / 92.8 | 994 |
| Commercial Catalyst | None | 4.5 | 16.8 | 45.9 / 51.3 / 56.1 | 93.8 / 92.9 / 91.8 | 1,095 |

[1] Wt. percent styrene in dehydrogenated mixture.

The selectivity data presented in Table II demonstrate clearly the superiority of the catalysts of the invention over the iron oxide catalysts in the art. When a matrix promoter for the iron oxide is present as evidenced by a magnetic susceptibility from about $30 \times 10^{-6}$ to about $300 \times 10^{-6}$ c.g.s.u., the catalyst is much more selective for styrene production at a given conversion level than when such a promoter is not present. Alternately, at a given selectivity level, conversions to styrene are higher. Consequently, styrene production over the life of such a catalyst can be significantly increased over that of conventional iron oxide catalysts.

While the invention has been illustrated specifically by the dehydrogenation of ethylbenzene to styrene, the catalysts of the invention are equally useful in the dehydrogenation of various other alkyl aromatic hydrocarbons having an alkyl side chain of at least two carbon atoms such as, for example, propylbenzene, diethylbenzene, ethyltoluene, propyltoluene, ethylnaphthalene, diethylnaphthalene, diethyl diphenyl and the like to the corresponding vinyl aromatic hydrocarbons. Likewise, the catalysts of the invention are suitable for use in the production of diolefins by dehydrogenation of monoolefins having at least four non-quaternary carbon atoms in a straight chain. They are particularly useful, for example, in the production of butadiene from butylene and are also applicable and advantageous for the production of other diolefins and particularly conjugated diolefins such as piperylene, isoprene, the various hexadienes and the like from the corresponding monoolefins.

What is claimed is:

1. A process for the dehydrogenation of more saturated hydrocarbons to less saturated hydrocarbons which comprises contacting the more saturated hydrocarbon in the presence of steam under dehydrogenation conditions with a catalyst consisting essentially of at least 35% by weight of iron oxide as the active catalytic agent, from about 1% to about 8% by weight of an oxide of a metal selected from the group consisting of zinc and copper intimately dispersed in the matrix of said iron oxide, the degree of said dispersion being such as to characterize the catalyst prior to use by a magnetic susceptibility in the range from about $30 \times 10^{-6}$ to about $300 \times 10^{-6}$ c.g.s.u., and about 0.5 to about 50% by weight of an alkali promoter, from about 1% to about 5% by weight of chromic oxide as a stabilizer, and a binding agent selected from the group consisting of silicates, hydraulic cements, kaolin and ball clay, said catalyst composition having a surface area in the range from about 1 to about 5 square meters per gram.

2. The process of claim 1 wherein said more saturated hydrocarbon is chosen from the group consisting of low molecular weight hydrocarbons having from 2 to 6 carbon atoms and alkyl aromatic hydrocarbons having at least two carbon atoms in the alkyl group.

3. The process of claim 2 wherein said more saturated hydrocarbon is an alkyl aromatic hydrocarbon having at least two carbon atoms in the alkyl group.

4. The process of claim 3 wherein said alkyl aromatic hydrocarbon is ethylbenzene.

5. The process of claim 4 wherein said metal oxide intimately dispersed in said iron oxide is zinc oxide and said alkali promoter is a compound of potassium.

6. The process of claim 4 wherein said metal oxide intimately dispersed in said iron oxide is copper oxide and said alkali promoter is a compound of potassium.

7. The process of claim 4 wherein said catalyst contains from about 2% to about 5% by weight of said metal oxide selected from the group consisting of zinc and copper, from about 5% to about 35% by weight of potassium carbonate.

8. The process of claim 7 wherein said catalyst contains 46.2% iron oxide, 5% zinc oxide, 26.3% potassium carbonate, 2.5% chromic oxide and 20% Portland cement.

9. The process of claim 7 wherein said catalyst contains 46.2% iron oxide, 5% copper oxide, 26.3% potassium carbonate, 2.5% chromic oxide, and 20% Portland cement.

10. A catalyst for effecting the dehydrogenation of more saturated hydrocarbons to less saturated hydrocarbons in the presence of steam consisting essentially of at least 35% by weight of iron oxide as the active catalytic agent, from about 1% to about 8% by weight of an oxide of a metal selected from the group consisting of zinc and copper intimately dispersed in the matrix of said iron oxide, the degree of said dispersion being such as to characterize the catalyst prior to use by a magnetic susceptibility in the range from about $30 \times 10^{-6}$ to about $300 \times 10^{-6}$ c.g.s.u., from about 0.5 to about 50% by weight of an alkali promoter, from about 1% to about 5% by weight of chromic oxide as a stabilizer and a binding agent selected from the group consisting of silicates, hydraulic cements, kaolin and ball clay, said catalyst composition having a surface area in the range from about 1 to about 5 square meters per gram.

11. The catalyst of claim 10 wherein said oxide intimately dispersed in said iron oxide is zinc oxide and said alkali promoter is a compound of potassium.

12. The catalyst of claim 10 wherein said oxide intimately dispersed in said iron oxide is copper oxide and said alkali promoter is a compound of potassium.

13. A catalyst as recited in claim 10 containing from about 2% to about 5% by weight of said oxide of a metal selected from the group consisting of zinc and copper, and from about 5% to about 35% by weight of potassium carbonate.

14. A catalyst as recited in claim 13 comprising 46.2% iron oxide, 5% zinc oxide, 26.3% potassium carbonate, 2.5% chromic oxide and 20% Portland cement.

15. A catalyst as recited in claim 13 comprising 46.2% iron oxide, 5% copper oxide, 26.3% potassium carbonate, 2.5% chromic oxide and 20% Portland cement.

References Cited

UNITED STATES PATENTS

| | | | |
|---|---|---|---|
| 2,786,817 | 3/1957 | Rottig et al. | 252—474 XR |
| 2,888,499 | 5/1959 | Pitzer et al. | 260—669 XR |
| 3,084,125 | 4/1963 | Soderquist et al. | 260—669 XR |
| 3,179,707 | 4/1965 | Lee | 260—669 |
| 3,205,179 | 9/1965 | Soderquist et al. | 260—669 XR |

DELBERT E. GANTZ, *Primary Examiner.*

C. R. DAVIS, *Assistant Examiner.*